US012338322B2

(12) United States Patent
Dennis et al.

(10) Patent No.: US 12,338,322 B2
(45) Date of Patent: Jun. 24, 2025

(54) PHOTO-RESPONSIVE DAMPENING AND TOUGHENING AGENTS

(71) Applicant: U.S. Army DEVCOM, Army Research Laboratory, Adelphi, MD (US)

(72) Inventors: Joseph M. Dennis, Chicago, IL (US); Joseph L. Lenhart, Port Deposit, MD (US); Randy A. Mrozek, Port Deposit, MD (US); Timothy W. Sirk, Churchville, MD (US); Juan De Pablo, Chicago, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/228,356

(22) Filed: Jul. 31, 2023

(65) Prior Publication Data

US 2024/0052096 A1 Feb. 15, 2024

Related U.S. Application Data

(60) Provisional application No. 63/395,463, filed on Aug. 5, 2022.

(51) Int. Cl.
*C08G 59/24* (2006.01)
*C08G 65/26* (2006.01)
(Continued)

(52) U.S. Cl.
CPC ......... *C08G 65/2603* (2013.01); *C08G 59/24* (2013.01); *C08K 5/23* (2013.01);
(Continued)

(58) Field of Classification Search
CPC ...... C08G 59/24; C08G 65/2603; C08K 5/23; C09K 9/02; C09K 2211/1007; C09K 2211/1014
See application file for complete search history.

(56) References Cited

U.S. PATENT DOCUMENTS

2021/0079134 A1* 3/2021 Aprahamian ........... C08F 18/22

OTHER PUBLICATIONS

Zhou, H., Xue, C., Weis, P. et al. Photoswitching of glass transition temperatures of azobenzene-containing polymers induces reversible solid-to-liquid transitions. Nature Chem 9, 145-151 (2017). (Year: 2017).*

(Continued)

*Primary Examiner* — Bijan Ahvazi
(74) *Attorney, Agent, or Firm* — Emily C. Moscati (57) ABSTRACT

In various aspects, a cured polymer glass may be provided. The cured polymer glass may include a polymer glass component (such as an epoxide component and an amine component), and an azobenzene photo-responsive modifying agent. The modifying agent may cause a reversible transition in the cured polymer glass from a first state to a second state when the modifying agent is exposed to a light condition (such as specific wavelengths of light). The glass transition temperature ($T_g$) of the cured polymer glass may be at least 100° C. The first state may have at least one different mechanical property than the second state. The reversible transition may be configured to occur when the cured polymer glass is at a first temperature below a $T_g$ of the cured polymer glass.

14 Claims, 8 Drawing Sheets

(51) Int. Cl.
C08K 5/23 (2006.01)
C09K 9/02 (2006.01)
(52) U.S. Cl.
CPC ........ *C09K 9/02* (2013.01); *C09K 2211/1007* (2013.01); *C09K 2211/1014* (2013.01)

(56) References Cited

OTHER PUBLICATIONS

Stumpel, J. E.; Broer, D. J.; Schenning, A. P. H. J., Stimuli-responsive photonic polymer coatings. Chem. Commun. 2014, 50 (100), 15839-15848.
Grossman, E.; Gouzman, I., Space environment effects on polymers in low earth orbit. Nucl. Instrum. Meth. B 2003, 208, 48-57.
Council, N. R., Opportunities in Protection Materials Science and Technology for Future Army Applications. The National Academies Press: Washington, DC, 2011; pp. 92-97.
Bills, A.; Sripad, S.; Fredericks, W. L.; Singh, M.; Viswanathan, V., Performance Metrics Required of Next-Generation Batteries to Electrify Commercial Aircraft. ACS Energy Lett. 2020, 5 (2), 663-668.
Sripad, S.; Viswanathan, V., Performance Metrics Required of Next-Generation Batteries to Make a Practical Electric Semi Truck. ACS Energy Lett. 2017, 2 (7), 1669-1673.
Zee, R. H.; Hsieh, C. Y., Energy absorption processes in fibrous composites. Mater. Sci. Eng. A 1998, 246 (1), 161-168.
Long, T. R.; Elder, R. M.; Bain, E. D.; Masser, K. A.; Sirk, T. W.; Yu, J. H .; Knorr, D. B.; Lenhart, J. L., Influence of molecular weight between crosslinks on the mechanical properties of polymers formed via ring-opening metathesis. Soft Matter 2018, 14 (17), 3344-3360.
Bain, E. D.; Knorr, D. B.; Richardson, A. D.; Masser, K. A.; Yu, J.; Lenhart, J. L., Failure processes governing high-rate impact resistance of epoxy resins filled with core-shell rubber nanoparticles. J. Mater. Sci. 2016, 51 (5), 2347-2370.
Crawford, E.; Lesser, A. J., The effect of network architecture on the thermal and mechanical behavior of epoxy resins. J. Polym. Sci. Pol. Phys. 1998, 36 (8), 1371-1382.
Arnebold, A.; Hartwig, A., Fast switchable, epoxy based shape-memory polymers with high strength and toughness. Polymer 2016, 83, 40-49.
Masser, K. A.; Knorr, D. B.; Hindenlang, M. D.; Yu, J. H.; Richardson, A. D.; Strawhecker, K. E.; Beyer, F. L.; Lenhart, J. L., Relating structure and chain dynamics to ballistic performance in transparent epoxy networks exhibiting nanometer scale heterogeneity. Polymer 2015, 58, 96-106.
Hedrick, J. L.; Yilgor, I.; Jurek, M.; Hedrick, J. C.; Wilkes, G. L.; McGrath, J. E., Chemical modification of matrix resin networks with engineering thermoplastics: 1. Synthesis, morphology, physical behaviour and toughening mechanisms of poly(arylene ether sulphone) modified epoxy networks. Polymer 1991, 32 (11), 2020-2032.
Liang, J.-Z., Toughening and reinforcing in rigid inorganic particulate filled poly(propylene): A review. J. Appl. Polym. Sci. 2002, 83 (7), 1547-1555.
Bagheri, R.; Marouf, B. T.; Pearson, R. A., Rubber-Toughened Epoxies: A Critical Review. Polym. Rev. 2009, 49 (3), 201-225.
Dennis, J. M.; Savage, A. M.; Mrozek, R. A.; Lenhart, J. L., Stimuli-responsive mechanical properties in polymer glasses: challenges and opportunities for defense applications. Polym. Int. n/a (n/a).
Liu, F.; Urban, M. W., Recent advances and challenges in designing stimuli-responsive polymers. Prog. Polym. Sci. 2010, 35 (1), 3-23.
Georgi, U.; Reichenbach, P.; Oertel, U.; Eng, L. M.; Voit, B., Synthesis of azobenzene-containing polymers and investigation of their substituent-dependent isomerisation behaviour. Reactive and Functional Polymers 2012, 72 (4), 242-251.
Salerno, K. M.; Lenhart, J. L.; de Pablo, J. J.; Sirk, T. W., Vapor-Deposited Glasses Highlight the Role of Density in Photostability. The Journal of Physical Chemistry B 2020, 124 (28), 6112-6120.
Pilz da Cunha, M.; Ambergen, S.; Debije, M. G.; Homburg, E. F. G. A.; den Toonder, J. M. J.; Schenning, A. P. H. J., A Soft Transporter Robot Fueled by Light. Advanced Science 2020, 7 (5), 1902842.
Pilz da Cunha, M.; Foelen, Y.; van Raak, R. J. H.; Murphy, J. N.; Engels, T. A. P.; Debije, M. G.; Schenning, A. P. H. J., An Untethered Magnetic- and Light-Responsive Rotary Gripper: Shedding Light on Photoresponsive Liquid Crystal Actuators. Advanced Optical Materials 2019, 7 (7), 1801643.
Verpaalen, R. C. P.; Pilz da Cunha, M.; Engels, T. A. P.; Debije, M. G.; Schenning, A. P. H. J., Liquid Crystal Networks on Thermoplastics: Reprogrammable Photo-Responsive Actuators. Angewandte Chemie International Edition 2020, 59 (11), 4562-4566.
Kumar, K.; Schenning, A. P. H. J.; Broer, D. J.; Liu, D., Regulating the Modulus of a Chiral Liquid Crystal Polymer Network by Light. Soft Matter 2016, 12 (13), 3196-3201.

\* cited by examiner

○ Solvent ━ Polymer Chain

✧ Photo-Active ⊘ Covalent Crosslink

PHOTO-RESPONSIVE DAMPENING AND TOUGHENING AGENTS

CROSS-REFERENCE TO RELATED APPLICATIONS

The present application claims priority to U.S. Provisional Patent Application No. 63/395,463, filed Aug. 5, 2022, the contents of which are incorporated by reference herein in its entirety.

GOVERNMENT INTEREST

The invention described herein may be manufactured and used by or for the Government of the United States for all governmental purposes without the payment of any royalty.

FIELD OF THE DISCLOSURE

The present disclosure is drawn to polymer glass additives, and specifically to photo-responsive polymer glass additives.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Polymer glasses are ubiquitous across industries for a number of applications including structural coatings, structural adhesives, protection applications, transportation lightweighting, and fiber-reinforced composites. For a structural adhesive application, these materials require a combination of moduli greater than 1 GPa, high yield strengths, and resistance to impact and creep. Historically, there is a compromise between structural performance and toughness, where structural adhesives with high glass transition temperatures ($T_g$), stiffness and strength tend to be brittle during impact, while more ductile resins generally have a lower $T_g$ and yield strengths.

Several methods have been developed to bridge this disparity in some target material property, but these conventional techniques ultimately lead to reductions in other desired properties, such as the $T_g$, stiffness, yield stress, or processability. The final material must then be optimized to balance the stiffness and toughness for a specific application.

BRIEF SUMMARY

Various deficiencies in the prior art are addressed below by the disclosed compositions of matter and techniques.

In various aspects, a cured polymer glass may be provided. The cured polymer glass may include a polymer glass component. A polymer glass component may include one or more components which, collectively, are known in the art to form polymeric glass networks. For example, the polymer glass components may include an epoxide component (such as Diglycidylether Bisphenol A (DGEBA), 1,2-Epoxy-3-phenoxypropane, or a combination thereof). The polymer glass component may include an amine component (such as 4,4'-methylenebis(2-ethylcyclohexylamine) (MPACM), poly(propylene glycol) bis(2-aminopropyl ether) with an average molecular weight of 230 g/mol (D230), or a combination thereof).

The cured polymer glass may include an azobenzene photo-responsive modifying agent. The azobenzene photo-responsive modifying agent may have a structure according to formula (I):

where $R^1$, $R^2$, and $R^3$ are independently, e.g., H or $NR^4R^5$; and where $R^4$ and $R^5$ are independently, e.g., H, O, an alkyl group, or a cyanate group. In some embodiments, the azobenzene photo-responsive modifying agent may be 4,4'-Diaminoazobenzene, 4-(4-Nitrophenylazo)aniline (Disperse Orange 3), 3-[N-Ethyl-4-(4-nitrophenylazo)phenylamino] propionitrile (Disperse Orange 25), or a combination thereof.

The azobenzene photo-responsive modifying agent may be disposed at various locations within the polymer glass. In some embodiments, a modify agent may be disposed at crosslinking junctions within the cured polymer glass. In some embodiments, a modifying agent may be disposed interstitially within the cured polymer glass. In some embodiments, a modifying agent may for a pendant group within the polymer glass.

The modifying agent may cause a reversible transition in the cured polymer glass from a first state to a second state when the modifying agent is exposed to a light condition (such as irradiation with one or more wavelengths of light to which the modifying agent is sensitive). The glass transition temperature ($T_g$) of the cured polymer glass may be at least 100° C.

The reversible transition may be configured to occur when the cured polymer glass is at a temperature below a $T_g$ of the cured polymer glass (such as a temperature at least 50° C. less than the $T_g$ of the cured polymer glass). The reversible transition may occur in less than 60 seconds.

The first state may have at least one different mechanical property than the second state. The at least one different mechanical property may include ductility, stiffness, dampening, and/or fracture toughness.

In various aspects, a method for controlling a mechanical property in a polymer glass, may be provided. The method may include providing a cured polymer glass comprising an azobenzene as disclosed herein. The method may include causing a reversible change in a mechanical response of the cured polymer glass in less than 60 seconds by exposing the cured polymer glass to at least one light while the cured polymer glass is below its glass transition temperature ($T_g$).

In various aspects, a method for forming a cured polymer glass may be provided, for polymer glass having mechanical properties that can be adjusted while the polymer glass is below its glass transition temperature ($T_g$). The method may include providing an epoxide component, an amine component, and an azobenzene as disclosed herein. The method may include forming an epoxy mixture by mixing all epoxide components together, and forming an amine mixture by mixing all amine components and all azobenzene together. The method may include forming a viscous epoxy-amine polymer network by mixing the epoxy mixture and the amine mixture together. The method may include removing trapped gasses and bubbles from the viscous epoxy-amine polymer network. The method may include pouring the viscous epoxy-amine polymer network into a mold. The method may include curing the viscous epoxy-amine polymer network by heating the viscous epoxy-amine polymer network using a predetermined heat schedule, the predetermined heat schedule including at least one portion of time where the temperature ramps up from a first temperature to a second temperature, and at least one additional portion of time where the temperature is maintained at the second temperature.

BRIEF DESCRIPTION OF FIGURES

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Alternatively, the use of external stimuli (e.g., light) to obtain orthogonal properties on-demand in glassy polymers is a potential avenue to obtain performance not found in a single material. Conventionally, photo-responsive chemistries are dominated by soft robotics, biomedical applications, and photolithography. None of these are directly transferrable to glassy polymer mechanics. Additionally, the response times for the state-of-the-art techniques from different polymer matrices and environments illustrating the average response times to reach >90% of the desired response is longer than 1 minute for photoisomerization driven processes.

The present disclosure integrates a photo-responsive azobenzene molecule into an epoxy-amine formulation. This was shown to have a rapid mechanical response when exposed to, e.g., a broad-spectrum UV-Visible light source. The response was observed within 20 seconds of exposure, and quantified using dynamic mechanical analysis and quasi-static mechanical testing.

The reversibility of the mechanical response is advantageous for many structural applications because it allows for a bimodal response on demand, and eliminates the need to compromise between material properties (e.g., stiffness and toughness). This invention is expected to have utility in a wide range of applications including, for example, active dampening materials for robotics, adhesive layering various composite materials, automotive light-weighting, and a new polymer matrix for composite design in aerospace and building construction.

Figure 1A:
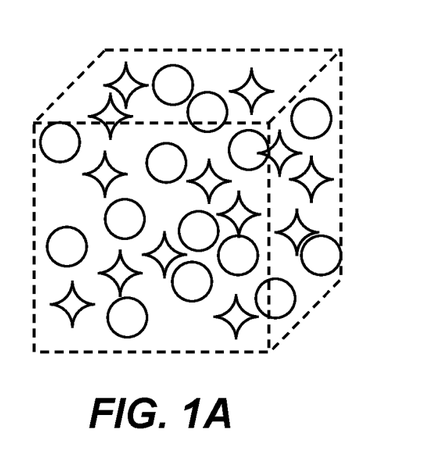
FIGS. 1A-1D show a conceptual illustration of mobility in polymer materials, in decreasing long-range mobility order, from a small molecule solution (1A), to a polymer solution (1B), to a linear bulk polymer (1C) to a crosslinked bulk polymer (1D).
Figure 1B:
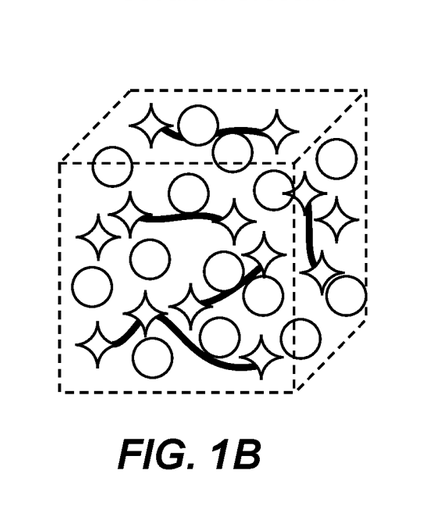
Figure 1C:
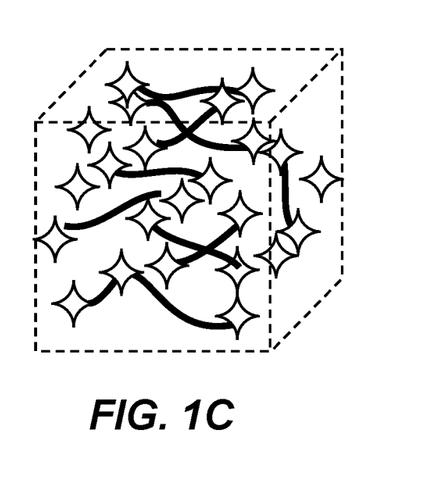
Figure 1D:
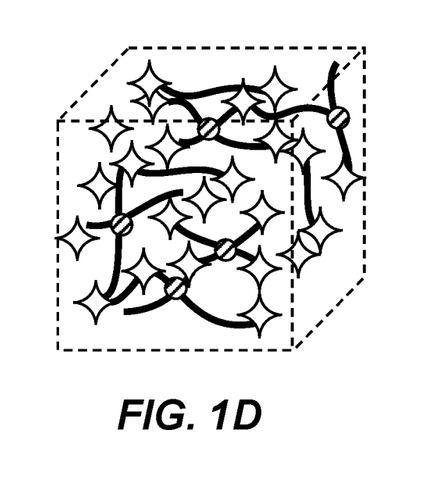

FIGS. 1A-1D illustrate a common perception when considering the various states of polymer materials, and the changes anticipated in the stimuli-activated response. Moving from FIG. 1A to 1D, the local constraints to the photoactive species increases. FIG. 1A represents a dilute solution of a small-molecule, photo-active compound and illustrates the least constrained molecular environment. Tethering the photo-active compound to a polymer chain in solution, either pendant to the chain or within the polymer backbone, reduces the conformational freedoms of the molecule and the mobility relative to the dilute solution. FIG. 1D illustrates a highly constrained system (e.g. a structural adhesive) where the addition of chemical crosslinks to a bulk polymer reduces the long-range mobility and increases the timescale for conformational rearrangements. In consequence, the addition of a photo-activated compound into a structural adhesive formulation is expected to reduce the rate of the photo-response and the percent conversion in comparison to a dilute, small-molecule solution.

Hypotheses to account for these observations include a reduction of local volume which limits the necessary reorientation to occur, decreases in local mobility when the photo-responsive moiety is attached to the polymer chain, and a combination of the two. Although these concepts are discussed frequently throughout the literature, there are a surprisingly few studies which attempt to prove the above hypotheses. One instance systematically increased the structural constraints through various substituents on azobenzenes and successive polymerizations. The authors studied the photo-isomerization response of the azobenzene unit from solution to bulk polymers, and identify significant increases in response times when increasing the size and number of substituents. Moreover, the response times are slow, on the order of 50× slower, when the azobenzene is removed from solution and suspended in a polymer matrix.

In the few examples of thin (less than 100 um thick) films where the photo-excited process was accomplished in 10 s of seconds, the macroscale response was reported as a thin film actuation (e.g., curling, or bending) driven by a photo-induced heating and subsequent relaxation in the liquid-crystal alignment. The reported actuation does not directly correlate to a change in quasi-static mechanical properties. Additionally, the $T_g$ of these systems was quite low (around 65° C.), and could not be used in structural applications More recently, a group has illustrated that the local density surrounding a photo-active species in simulated vapor-deposited azobenzene glasses was a dominate factor in the isomerization process of the azobenzene molecule within the glass.

Thus, the use of an azobenzene photo-responsive modifying agent to cause a crosslinked, structural adhesive to exhibit rapid macroscopic mechanical changes with a stimulus such as light is quite unexpected.

In various aspects, a cured polymer glass may be provided. The cured polymer glass may include one or more polymer glass components. Polymer glass components may include any material or combination of materials known in the art that are capable of forming a polymeric glass network. Non-limiting examples of such polymer glass networks include cross-linked networks formed from, e.g., epoxy-amines, methacrylates, styrenics, anhydrides, epoxy-thiols, and combinations thereof. In some embodiments, the polymer glass is free of siloxanes.

The cured polymer glass may form an epoxy-amine polymer network. Such epoxy-amine networks are well-known in the art.

In some embodiments, the cured polymer glass may include an epoxide component. Such epoxides, for use in creating epoxy-amine polymer networks, is well known art. In some embodiments, the epoxide component includes a monoaromatic and/or diaromatic epoxide. Non-limiting examples of such epoxide components include such as Diglycidylether Bisphenol A (DGEBA), 1,2-Epoxy-3-phenoxypropane, or a combination thereof.

The cured polymer glass may include an amine component. Such amines, for use in creating epoxy-amine polymer networks, is well known art. In some embodiments, the amine component may have one or more primary amine groups. In some embodiments, the amine component may only have primary amine groups. Non-limiting examples of such amine components include 4,4'-methylenebis(2-ethylcyclohexylamine) (MPACM), poly(propylene glycol) bis(2-aminopropyl ether) with an average molecular weight of 230 g/mol (D230), or a combination thereof.

The cured polymer glass may include a (meth)acrylate. As used herein, the term "(meth)acrylate" means acrylate, methacrylate, or a mixture thereof. The term "(meth)acrylate" includes an ester, a salt, or a conjugate base of methacrylic acid, with the formula —[$CH_2$=$C(R)$—$COO^-$]—, wherein R is H, Me, or a mixture thereof. By extension, a monomer, oligomer, or polymer name containing as a part of its term the string "(meth)acrylate" should be interpreted as referring to the same monomer, oligomer, or polymer, that is an acrylate, methacrylate, or a mixture thereof. In some embodiments, the cured polymer glass may include a methacrylate. As used herein, the term "methacrylate" includes an ester, a salt, or a conjugate base of methacrylic acid, with the formula —[$CH_2$=$C(CH_3)$—$COO^-$]—.

The cured polymer glass may include a styrenic polymer. As used herein, the term styrenic polymer is inclusive of polymers derived from one or more alkenyl aromatic compounds such as styrene, methylstyrene, ethylstyrenes, vinyl benzene, chlorostyrenes, and bromostyrenes. In some embodiments, minor amounts (i.e., <5 percent by weight) of copolymerizable compounds such as $C_{1-4}$ methacrylates and acrylates, acrylic acid, methacrylic acid, maleic acid, acrylonitrile, maleic anhydride, and vinyl acetate may be incorporated into the styrenic polymer.

The cured polymer glass may include an anhydride. As used herein the term "anhydride" refers to molecules derived from two carboxylic acid moieties with loss of a molecule of water via either an intermolecular or an intramolecular reaction. The term "anhydride" may include mono-, di-, and poly-anhydrides.

The cured polymer glass may include a thiol component. As is understood in the art, a thiol is an organosulfur compound that contains a carbon-bonded sulfhydryl or mercapto group. The thiol is preferably a polythiol having two or more thiol groups per molecule. The thiol may function as curatives for an epoxy component. Non-limiting examples of polythiols include trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), butane-1,4-dithiol, hexane-1,6-dithiol), and 1,3,5-tris (mercaptomethyl) benzene, or a combination thereof.

The cured polymer glass may include an azobenzene photo-responsive modifying agent. The modifying agent may be any photo-responsive azobenzene.

In some embodiments, the azobenzene photo-responsive modifying agent may have a structure according to formula (I):

(I)

$R^1$, $R^2$, and $R^3$ may independently be H or a functional group. The functional group may be $NR^4R^5$; and where $R^4$ and $R^5$ are independently, e.g., H, O, an alkyl group (such as a C1-C12 alkyl group), or a cyanate group (such as an alkylcyanate, such as a C1-C12 alkylcyanate). In some embodiments, the functional group may be an acrylamide group.

In some embodiments, the azobenzene photo-responsive modifying agent may be 4,4'-Diaminoazobenzene, 4-(4-Nitrophenylazo)aniline (Disperse Orange 3), 3-[N-Ethyl-4-(4-nitrophenylazo)phenylamino]propionitrile (Disperse Orange 25), or a combination thereof.

The azobenzene photo-responsive modifying agent may be disposed at various locations within the polymer glass. In some embodiments, a modifying agent may be disposed at crosslinking junctions within the cured polymer glass. In some embodiments, a modifying agent may be disposed interstitially within the cured polymer glass. In some embodiments, a modifying agent may be a pendant group within the polymer glass.

The modifying agent may cause a reversible transition in the cured polymer glass from a first state to a second state when the modifying agent is exposed to a light condition (such as irradiation with one or more wavelengths of light to which the modifying agent is sensitive). In some embodiments, the polymer glass may be exposed to a broad UV-vis spectrum. In some embodiments, the polymer glass may be exposed to specific wavelengths (such as via a laser diode, etc.).

The glass transition temperature ($T_g$) of the cured polymer glass may be at least 100° C.

The reversible transition may be configured to occur when the cured polymer glass is at a temperature below a $T_g$ of the cured polymer glass (such as a temperature at least 50° C. less than the $T_g$ of the cured polymer glass). The reversible transition may occur in less than 60 seconds.

The first state may have at least one different mechanical property than the second state. The at least one different mechanical property may include ductility, stiffness, dampening and/or fracture toughness.

In various aspects, a method for controlling a mechanical property in a polymer glass, may be provided. The method may include providing a cured polymer glass comprising an azobenzene as disclosed herein. The method may include causing a reversible change in a mechanical response of the cured polymer glass in less than 60 seconds by exposing the cured polymer glass to at least one light while the cured polymer glass is below its glass transition temperature ($T_g$).

For example, in some embodiments, a Honle Bluepoint 4 Ecocure UV source was used with a single, 8 mm, flexible, light guide to irradiate samples during analysis. The light source was filtered using a 390-500 nm filter placed at the source. The measured intensity of the filtered light at a 2 mm distance from the 8 mm light guide was approximately 6,000 mW/cm².

When this light source was activated, it causes reversible changes in various embodiments of the polymer glass.

In various aspects, a method for forming a cured polymer glass may be provided, for polymer glass having mechanical properties that can be adjusted while the polymer glass is below its glass transition temperature ($T_g$). The method may include providing an epoxide component, an amine component, and an azobenzene as disclosed herein. The method may include forming an epoxy mixture by mixing all epoxide components together, and forming an amine mixture by mixing all amine components and all azobenzene together. The method may include forming a viscous epoxy-amine polymer network by mixing the epoxy mixture and the amine mixture together. The method may include removing trapped gasses and bubbles from the viscous epoxy-amine polymer network. The method may include pouring the viscous epoxy-amine polymer network into a mold. The method may include curing the viscous epoxy-amine polymer network by heating the viscous epoxy-amine polymer network using a predetermined heat schedule, the predetermined heat schedule including at least one portion of time where the temperature ramps up from a first temperature to a second temperature, and at least one additional portion of time where the temperature is maintained at the second temperature.

EXAMPLES

For the following disclosed examples, various chemicals were utilized. Diglycidylether Bisphenol A (DGEBA) was purchased from Sigma Aldrich with a reported 186 g/eq epoxide. Poly(propylene glycol) bis(2-aminopropyl ether), with an average molecular weight of 230 g/mol (D230) was used as received from Fischer Scientific with a reported 8.5 meq/g. 4,4'-Methylenebis(2-ethylcyclohexylamine), (MPACM) and 1,2-Epoxy-3-phenoxypropane (EPP) were purchased from Sigma Aldrich with a reported purity of 99%. Disperse Orange 3 (DO3, 90% dye content), and Disperse Orange 25 (DO25, 95% dye content) were purchased from Sigma Aldrich. 4,4'-Diaminoazobenzene (DAAB, 95%) was purchased from Fischer Scientific.

All formulations were hand-mixed at room temperature for 5 min until a homogenous mixture was obtained. This mixture was then sonicated for 15 min to remove trapped gases and bubbles in the viscous solution. The solution was then poured into molds of varying dimensions depending on the analysis to be done. The mold dimensions are described in the following analysis section. The molds were then placed in a vacuum oven under a constant nitrogen purge to cure. The oven was programmed with the following cure schedule: 4 h isothermal at 25° C., 1 h temperature ramp from 25 to 80° C., 4 h isothermal at 80° C., 1 h temperature ramp from 80 to 120° C., 4 h isothermal at 120° C., 1 h temperature ramp from 120 to 180° C., 4 h isothermal at 180° C. After the isothermal at 180° C., the oven turned off and the contents cooled to room temperature over the course of several hours. With the given temperature profile, the epoxy and amine functionalities reacted together to form an insoluble, crosslinked polymer glass. Once cooled to room temperature, the polymer glass was removed from the molds and tested without further purification or thermal treatment.

Example 1—$10^{-4}$ M Azobenzene in the Interstitial Space Between Chains ($10^{-4}$ DO25)

A two-part epoxy-amine formulation was prepared as follows. Part A, which consists of only epoxide components, was prepared by adding 231.5 g of DGEBA to 32.95 g of EPP. This was hand mixed until the contents formed a homogenous, clear, viscous solution. Part B, which consists of only amine components, was prepared by adding 30.0 g of D230 and 70.0 g of MPACM to 24.25 mg of DO25. The contents of Part B were then mixed and sonicated at 25° C. until a homogenous, red, transparent viscous solution was obtained. Part A and B were then combined at a weight ratio of 3.041 to 1, A to B and hand mixed until a homogenous solution was obtained. This was then sonicated for 10 min to remove trapped gases and bubbles. The final solution was cast into molds and cured.

Example 2—$10^{-3}$ M Azobenzene in the Interstitial Space Between Chains ($10^{-3}$ DO25)

A two-part epoxy-amine formulation was prepared as follows. Part A, which consists of only epoxide components, was prepared by adding 231.5 g of DGEBA to 32.95 g of EPP. This was hand mixed until the contents formed a homogenous, clear, viscous solution. Part B, which consists of only amine components, was prepared by adding 30.0 g of D230 and 70.0 g of MPACM to 242.5 mg of DO25. The contents of Part B were then mixed and sonicated at 25° C. until a homogenous, red, transparent viscous solution was obtained. Part A and B were then combined at a weight ratio of 3.041 to 1, A to B and hand mixed until a homogenous solution was obtained. This was then sonicated for 10 min to remove trapped gases and bubbles. The final solution was cast into molds and cured.

Example 3—$10^{-4}$ M Azobenzene Pendant to the Polymer Network ($10^{-4}$ DO3)

A two part epoxy-amine formulation was prepared as follows. Part A, which consists of only epoxide components, was prepared by adding 231.5 g of DGEBA to 32.95 g of EPP. This was hand mixed until the contents formed a homogenous, clear, viscous solution. Part B, which consists of only amine components, was prepared by adding 30.0 g of D230 and 70.0 g of MPACM to 24.25 mg of DO3. The contents of Part B were then mixed and sonicated at 25° C. until a homogenous, red, transparent viscous solution was obtained. Part A and B were then combined at a weight ratio of 3.041 to 1, A to B and hand mixed until a homogenous solution was obtained. This was then sonicated for 10 min to remove trapped gases and bubbles. The final solution was cast into molds and cured.

Example 4—$10^{-3}$ M Azobenzene Pendant to the Polymer Network ($10^{-3}$ DO3)

A two-part epoxy-amine formulation was prepared as follows. Part A, which consists of only epoxide components, was prepared by adding 231.5 g of DGEBA to 32.95 g of EPP. This was hand mixed until the contents formed a homogenous, clear, viscous solution. Part B, which consists of only amine components, was prepared by adding 30.0 g of D230 and 70.0 g of MPACM to 242.5 mg of DO3. The contents of Part B were then mixed and sonicated at 25° C. until a homogenous, red, transparent viscous solution was obtained. Part A and B were then combined at a weight ratio of 3.041 to 1, A to B and hand mixed until a homogenous solution was obtained. This was then sonicated for 10 min to remove trapped gases and bubbles. The final solution was cast into molds and cured.

Example 5—$10^{-4}$ M Azobenzene as a Crosslinking Junction ($10^{-4}$ DAAB)

A two-part epoxy-amine formulation was prepared as follows. Part A, which consists of only epoxide components, was prepared by adding 231.5 g of DGEBA to 32.95 g of EPP. This was hand mixed until the contents formed a homogenous, clear, viscous solution. Part B, which consists of only amine components, was prepared by adding 30.0 g of D230 and 70.0 g of MPACM to 24.25 mg of DAAB. The contents of Part B were then mixed and sonicated at 25° C. until a homogenous, red, transparent viscous solution was obtained. Part A and B were then combined at a weight ratio of 3.041 to 1, A to B and hand mixed until a homogenous solution was obtained. This was then sonicated for 10 min to remove trapped gases and bubbles. The final solution was cast into molds and cured.

Example 6—$10^{-3}$ M Azobenzene as a Crosslinking Junction ($10^{-3}$ DAAB)

A two-part epoxy-amine formulation was prepared as follows. Part A, which consists of only epoxide components, was prepared by adding 231.5 g of DGEBA to 32.95 g of EPP. This was hand mixed until the contents formed a homogenous, clear, viscous solution. Part B, which consists of only amine components, was prepared by adding 30.0 g of D230 and 70.0 g of MPACM to 242.5 mg of DAAB. The contents of Part B were then mixed and sonicated at 25° C. until a homogenous, red, transparent viscous solution was obtained. Part A and B were then combined at a weight ratio of 3.041 to 1, A to B and hand mixed until a homogenous solution was obtained. This was then sonicated for 10 min to remove trapped gases and bubbles. The final solution was cast into molds and cured.

Comparative Formula 1—No Azobenzene in the Polymer Network (Control)

A two-part epoxy-amine formulation was prepared as follows. Part A, which consists of only epoxide components, was prepared by adding 231.5 g of DGEBA to 32.95 g of EPP. This was hand mixed until the contents formed a homogenous, clear, viscous solution. Part B, which consists of only amine components, was prepared by adding 30.0 g of D230 to 70.0 g of MPACM. The contents of Part B were then mixed and sonicated at 25° C. until a homogenous, red, transparent viscous solution was obtained. Part A and B were then combined at a weight ratio of 3.041 to 1, A to B and hand mixed until a homogenous solution was obtained. This was then sonicated for 10 min to remove trapped gases and bubbles. The final solution was cast into molds and cured.

Evaluations

Using Dynamic Mechanical Analysis (DMA) on thin films, the thermomechanical properties of the cured epoxy-amine polymer glasses were measured. For DMA, A TA Instruments RSA-G2 solids analyzer equipped with a tension geometry and forced convection oven was used to measure the mechanical properties of the polymer glasses under small amplitude oscillatory extension. A rectangular mold lined with Kapton® tape with dimensions of 8 mm wide, 16 mm long and 0.3 mm deep was used to fabricate the rectangular specimens for DMA. These dimensions were chosen to optimize the stiffness of the sample for the transducer range of the RSA-G2. For thermal-mechanical properties, the molded samples were loaded into the instrument with a constant 0.2 N tensional force applied normal to the samples rectangular cross section. The sample was then heated with a 3° C./min heating rate and a 0.1% oscillatory strain. Throughout the temperature ramp the distance between the clamp grips was adjusted to maintain a 0.2 N tension. Above the $T_g$, the oscillatory strain was increased to 1% to improve the measured torque value into the reported working range for the transducer. During the UV-exposure testing, the same sample geometry was used as the temperature ramp, but the oven was removed to accommodate the 8 mm light guide. The light guide was placed 2 mm from the sample surface and centered between the 16 mm gauge length. Again, a 0.2 N tension force was applied and maintained throughout the experiments, and the light source was manually shuttered at 120 s time intervals.

Table 1, below, lists the results of the analysis. Importantly, the introduction of the azobenzene molecules did not dramatically influence the $T_g$ or the apparent molecular weight between crosslinks, $M_{c,a}$. The $M_{c,a}$ was estimated using the theory of rubber elasticity, as defined by Flory. It is commonly understood that the mechanical properties in polymer glasses are dependent on these two parameters, and using compositions which are identical in these two material properties eliminates confounding results imparted by the complex viscoelastic behavior of polymers.

TABLE 1

Summary of thermomechanical data using DMA.

| Sample | $T_g$ (° C.) | T at $E_{min}'$ (° C.) | $E_{min}'$ (MPa) | $v_c + v_e$* (mmol/cm3) | $M_{c,a}$** (g/mol) |
|---|---|---|---|---|---|
| Control | 117 | 140 | 10.2 | 0.999 | 1200 |
| 10⁻⁴ DO25 | 115 | 137 | 9.71 | 0.948 | 1200 |
| 10⁻⁴ DO3 | 116 | 140 | 11.1 | 1.082 | 1100 |
| 10⁻⁴ DAAB | 117 | 138 | 10.0 | 0.974 | 1200 |
| 10⁻³ DO25 | 120 | 139 | 10.1 | 0.984 | 1200 |
| 10⁻³ DO3 | 116 | 140 | 12.1 | 1.180 | 1000 |
| 10⁻³ DAAB | 115 | 138 | 10.7 | 1.046 | 1100 |

* = As Defined $\frac{E'}{3RT} = v_c + v_e$.
** = Estimated using $\rho = 1.16$ g/cm³.

In addition to using DMA as a tool to investigate the thermomechanical response of the polymer networks, small-amplitude oscillatory tensile experiments were performed while shuttering a high intensity light source at room temperature. See FIGS. 2A-2C. With all exposure measurements occurring at room temperature, the materials are approximately 100° C. below Tg. In comparison to the control, all azobenzene-containing polymer glasses show marked differences in the softening of the material (indicated by a decrease in the storage modulus). Moreover, the location and the concentration of the azobenzene species within the polymer network does impact the effectiveness and magnitude of the response to light. For instance, an azobenzene group located at the crosslinking junction of the polymer network (e.g. DAAB) (see FIG. 2C) seems to be the most effective at inducing a mechanical change in the polymer network compared to the same concentration of either the interstitial (DO25) (see FIG. 2A) or pendant groups (DO3) (see FIG. 2B).

Figure 2A:
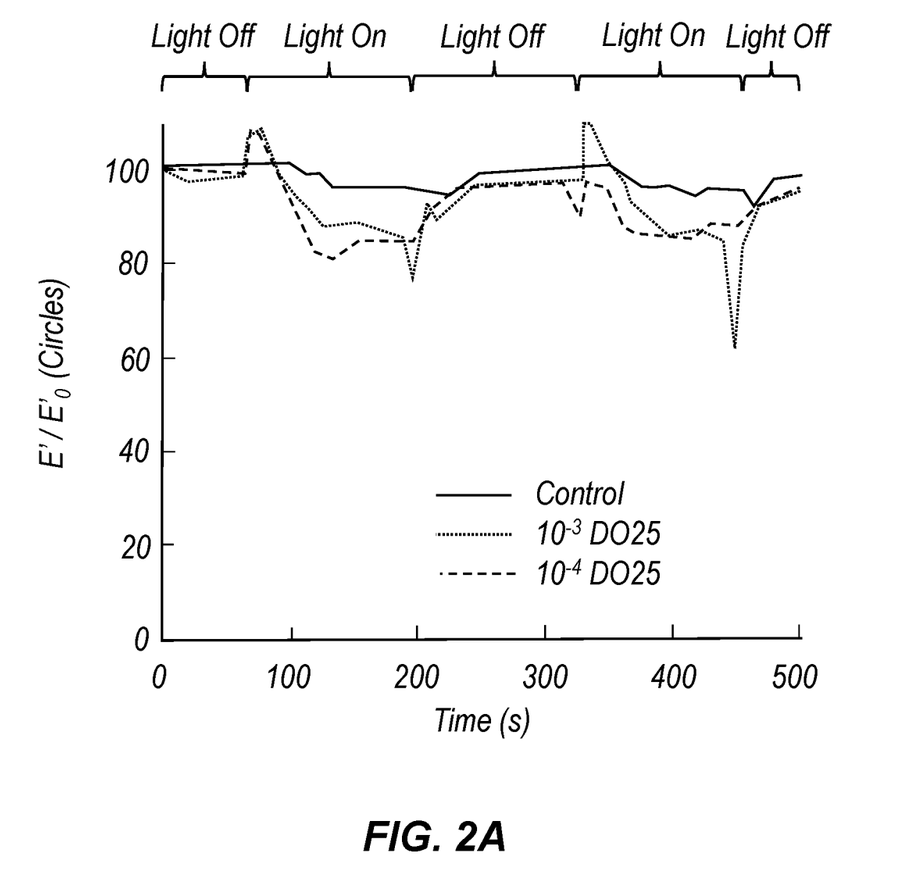
FIGS. 2A-2C are graphs showing photo-induced mechanical responses in azobenzene-containing epoxy-amine polymer networks, and specifically a comparison of concentration effects in the interstitial placement of an azobenzene compound (DO25) (2A), concentration effects of a pendant azobenzene compound (DO3) (2B), and concentration effects of an azobenzene compound (DAAB) located at the crosslinking junction in a polymer network (2C), with indications where the activating light is on or off.

Interestingly, increasing the concentration of DO25 has minimal influence on the magnitude of the photo-induced mechanical change. This suggests a saturation in the mechanical response likely because of the mechanical isolation since the molecule is not covalently bound to the polymer matrix. In contrast, DAAB and DO3 have covalent bonds to the polymer network and produce a monotonic change with increasing concentration.

Figure 2B:
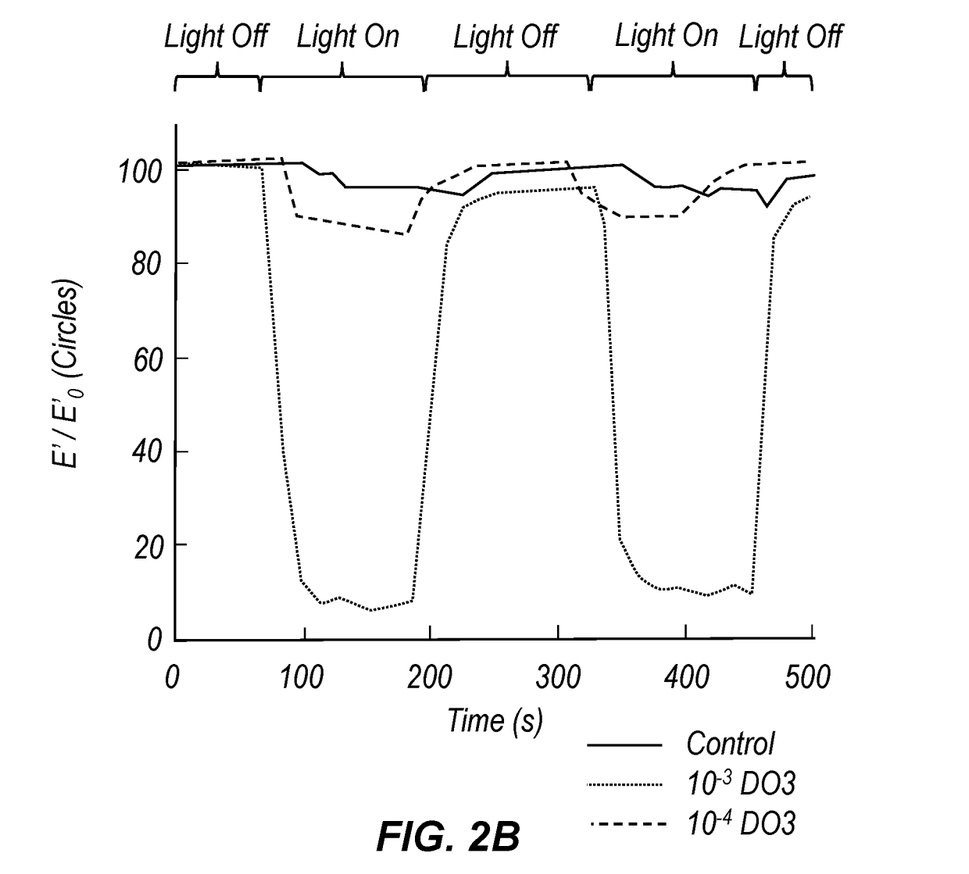
Figure 2C:
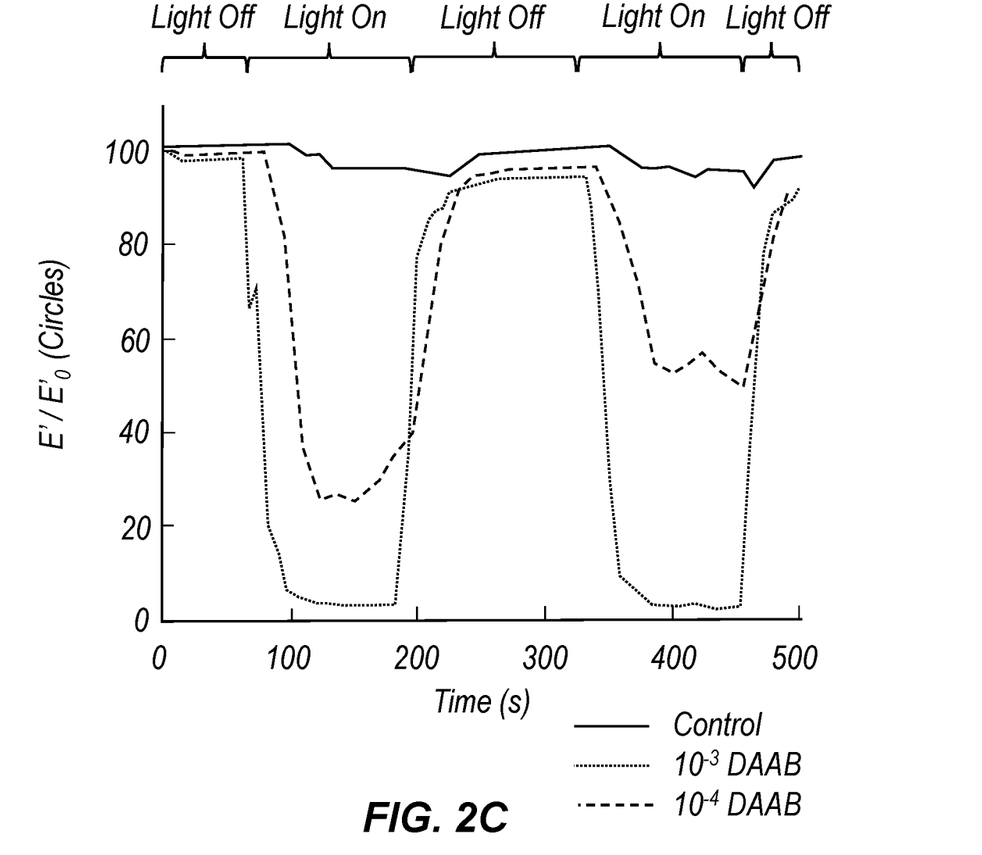

Further, it is noted that a rapid mechanical dampening of circa 20 seconds is observed for all azobenzene-containing polymer glasses regardless of concentration or location in the polymer network.

Figure 3:
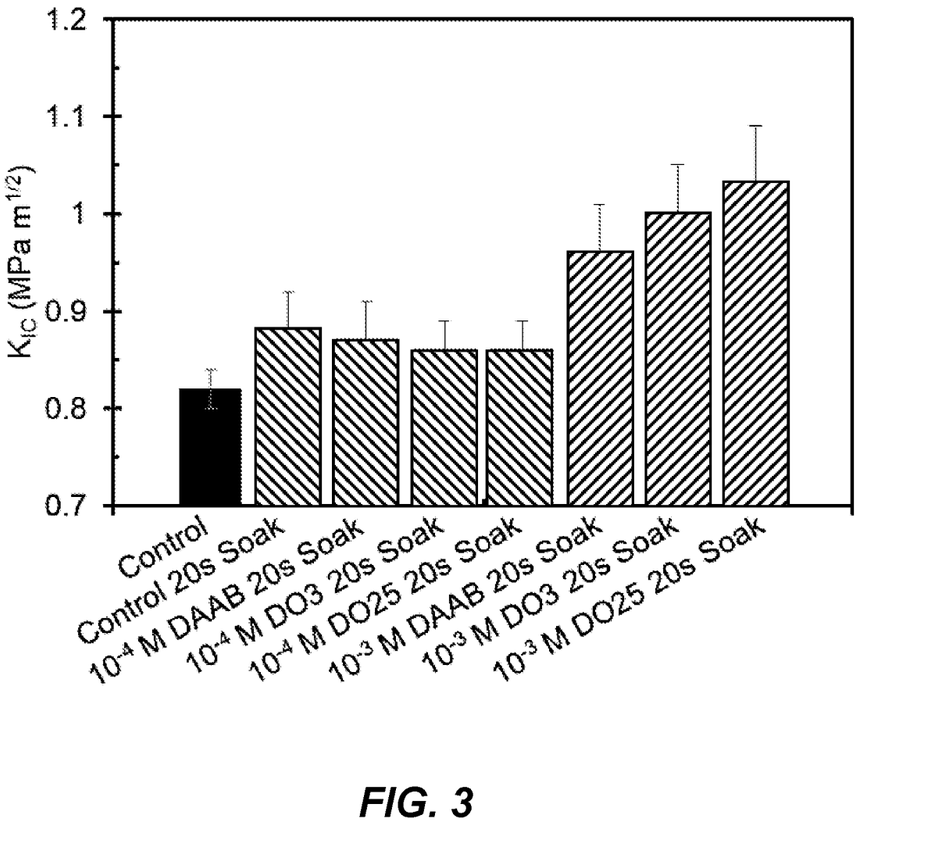
FIG. 3 is a graph showing a comparison of mode I fracture toughness in the control resin and illuminated azobenzene-containing, epoxy-amine polymer networks with 20 second light exposure.
Figure 4A:
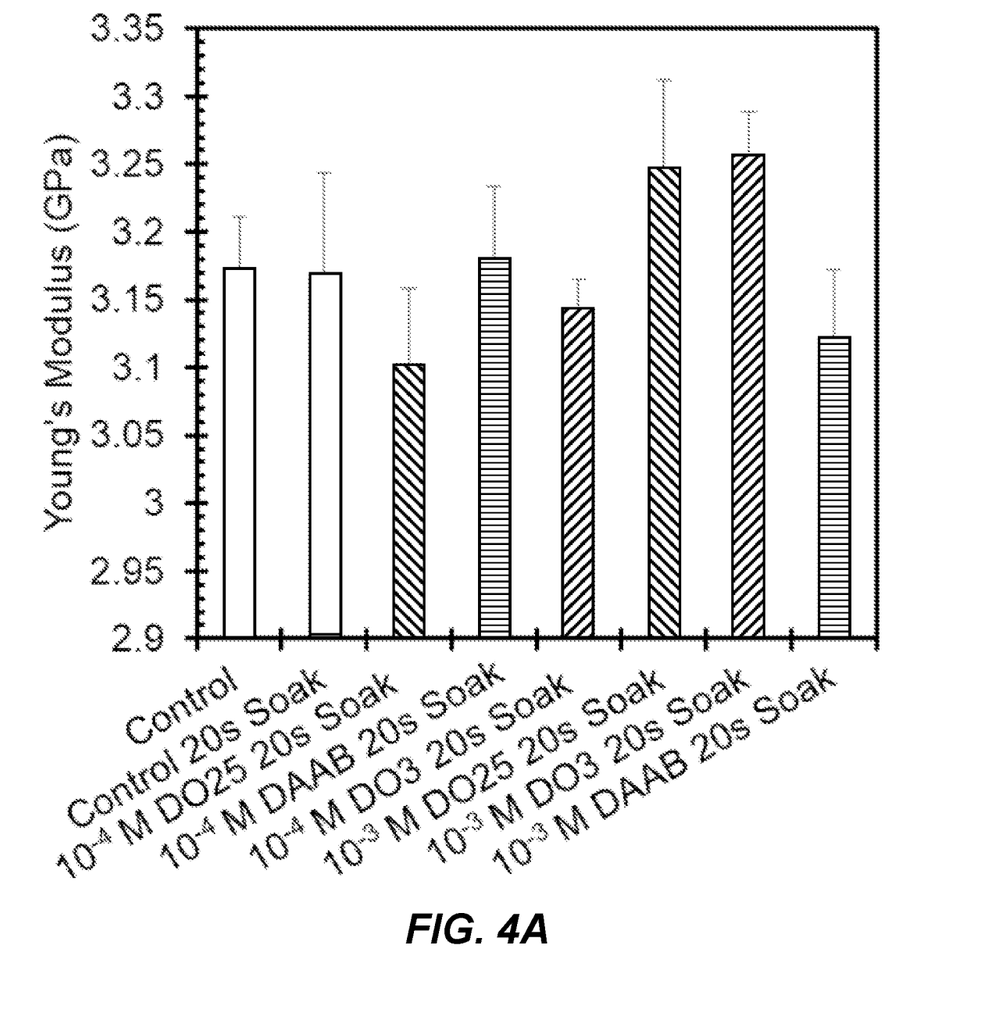
FIGS. 4A and 4B are graphs showing comparisons of Young's Modulus (4A) and Yield stress (4B) in the control resin and illuminated azobenzene-containing, epoxy-amine polymer networks with 20 second light exposure.
Figure 4B:
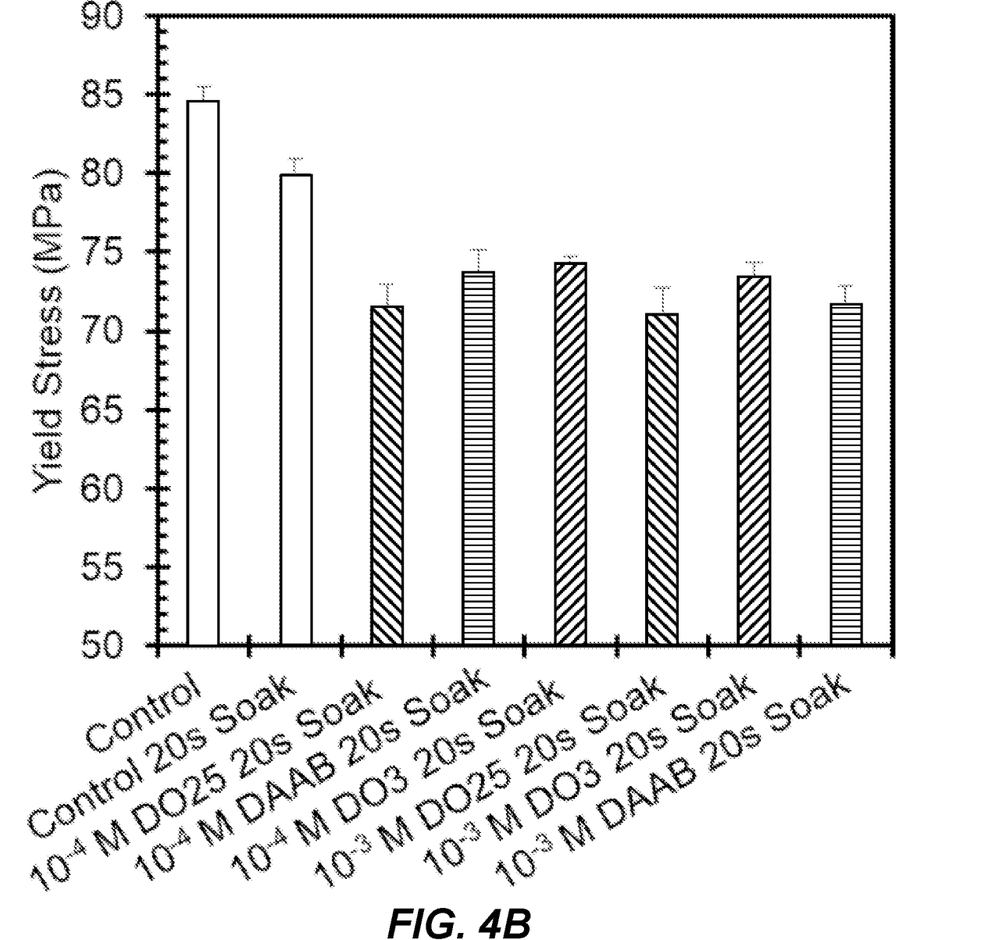

In addition to the rapid softening and increased mechanical dampening imposed by modulating the storage modulus, isomerization of the azobenzene groups within a glassy matrix also increased toughness and was quantified by a critical mode I fracture toughness, $K_{IC}$ (see FIG. 3). Moreover, the yield strength of the azobenzene-containing networks observed significant decreases while maintaining constant Young's Modulus, aka stiffness (see FIGS. 4A and 4B).

Similar to the DMA experiments, the quasi-static testing was performed using a manually shuttered, high-intensity filtered light.

All samples were machined from 6" L×6" W×6 mm T cured plates using a ProtoMax WaterJet to the dimensions specified. Quasi-static mechanical analysis utilized an Instron 5869 equipped with a 50 kN load cell. Tensile data followed American Society for Testing and Materials (ASTM) standard D638-10 using a Type IV specimen geometry. Six to eight specimens were used per sample. The typical cross-section in the gauge region measured approximately 6 mm×6 mm. The cross-head speed was set to 5 mm/min and a strain gauge extensometer with 25 mm gauge length monitored strain deviation resulting from frame loading. Fracture toughness was measured according to ASTM D5045-99 using 10 specimens with a single-edge-notch bending specimen geometry (approximately 6 mm×12 mm×53 mm). The cross-head speed was set at 1 mm/min, with a nominal 48 mm testing span. A pre-crack was created by tapping a razor blade inserted in the notch with a hammer resulting in a crack that propagated ahead of the razor tip.

Prior to starting the testing, the specimen was exposed to the filtered light for 20 seconds to reach the quasi-steady-modulus observed in the DMA experiments. The light remained on for the remainder of the experiment, which did not exceed 1 minute time. Interestingly, at the lower concentrations of 10⁻⁴ M the photo-induced isomerization has minimal effect on the fracture toughness even though the linear-viscoelastic modulus, measured in the DMA, is changing significantly, as disclosed herein. However, the higher concentrations of 10⁻³ M show statistically increasing $K_{IC}$ values over the control matrix under exposure to high-intensity, filtered light. In contrast, the yield strength is equally reduced under illumination regardless of the concentration or location of the azobenzene moiety.

Comparing the illuminated control to the azobenzene-containing materials demonstrates that convectional heating from the light source is not the leading mechanism for the change in properties. Therefore, the photo-induced isomerization of azobenzene in a polymer glass can be used to rapidly, and independently decrease yield strength, and increase fracture toughness on command without compromising stiffness. Moreover, these observations illustrate a non-obvious influence of azobenzene activation on the quasi-static mechanical properties.

As disclosed herein, the rapid changes in mechanical properties are anticipated to find application in a wide range of areas. In some embodiments, the mechanical properties are ductility, stiffness, dampening and/or fracture toughness.

In some embodiments, for example with regards to robotics or vehicles, mechanical property relates to a high-rate impact response.

Figure 5:
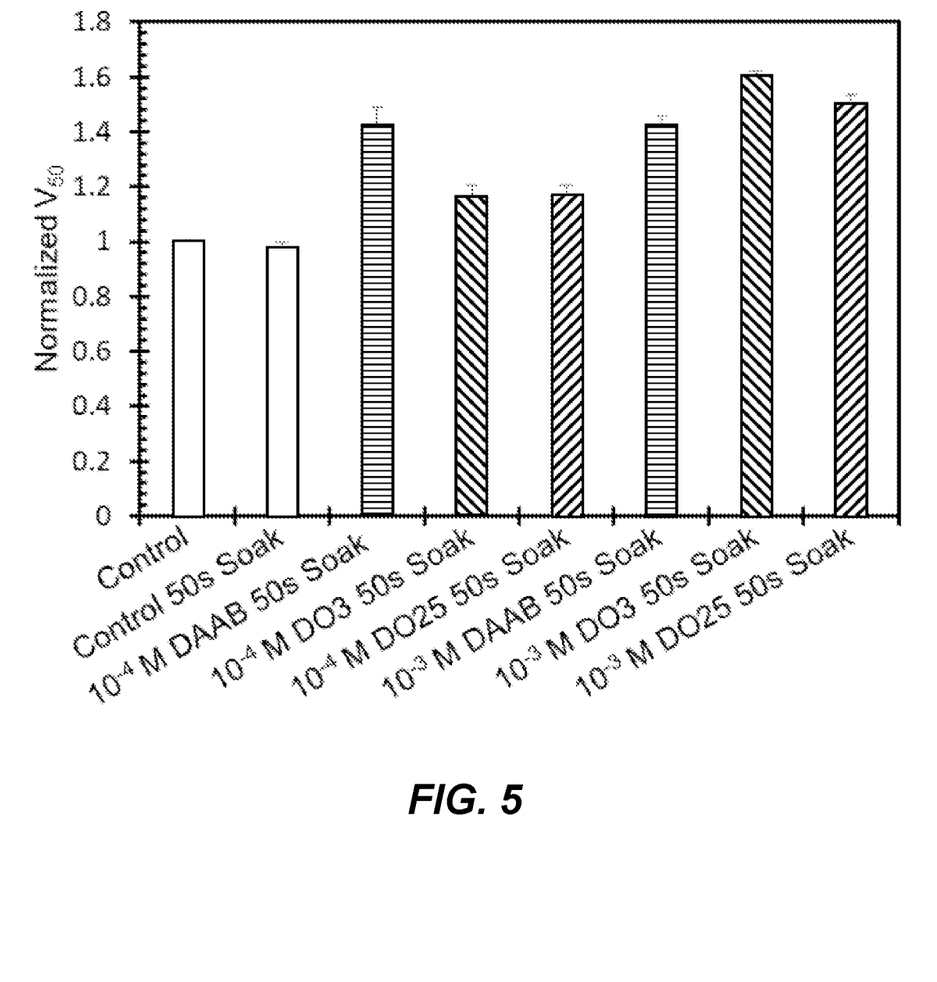
FIG. 5 is a graph showing a comparison of normalized high-rate, $V_{50}$ impact results for the control resin and illuminated azobenzene-containing, epoxy-amine polymer networks with 50 second light exposure.

Therefore, high-velocity impact testing was conducted to evaluate the changes in behavior with and without light exposure. Such impact tests were conducted using a 0.22 caliber gas gun at room temperature (about 22° C.). The speed of a 5.56 mm diameter stainless steel ball bearing was measured by Doppler radar. Two different types of fixtures were used during the test to obtain two sets of complementary data. One fixture comprised two steel plates with nominally 50 mm-diameter circular windows, and the sample was sandwiched in between. The other fixture was a box construction in which approximately 62.5 mm by 62.5 mm sample plates were placed and were only supported on the edges during the impact. An aluminum sheet was placed behind the sample, and failure was assigned when the sheet was penetrated by the ball bearing or fragment of the sample. A $V_{50}$ was determined. $V_{50}$ represents the projectile velocity at which there is a 50% probability of perforation of the aluminum sheet and is normalized to the room temperature $V_{50}$ value of the control sample. A total of (10-12) specimens were used for determining average $V_{50}$ values. FIG. 5 summarizes the $V_{50}$ results.

Similar to the previous mechanical testing, the polymer samples were illuminated on the backside of the impact site for approximately 50 seconds prior to impact. Faster responses could not be tested because of limitations in the experimental set-up and safety of the operators. However, across all samples there is a significant increase in the normalized $V_{50}$ under illumination. In certain formulations (e.g., DAAB) the increase is greater than 50% over the control containing no azobenzene compounds.

The change in the fracture behavior can also be seen visually. The non-illuminated samples observed a brittle fracture typical of epoxy matrices. In contrast, the illuminated samples displayed a mixed mode fracture with a reduction in radial cracking. Furthermore, the illuminated samples consistently jettisoned large fragments of material surrounding the illuminated area. The combination of ductile deformation, larger fragmentation and reductions in radial cracking support the significant increases in $V_{50}$.

As will be understood, certain useful applications require materials to be adaptable to a wide range of operational conditions, with specifications defining certain predictable performance characteristics that must be met over a broad temperature range. For example, in some embodiments, a material may have required functionality that is independent of the current temperature, within an operational range of, e.g., −55° C. to 75° C.

As will be understood, these materials may be useful in a variety of applications.

In some embodiments, a system may be provided wherein a desired compound is encapsulated or prevented from escaping a container by a polymer glass as described herein. When light is applied to the polymer glass (or light is removed), the properties could be modified, such that the desired compound could be released. For example, in some embodiments, an active pharmaceutical ingredient may be released when a thin polymer glass coating is exposed to light, adjusting the permeability of the polymer glass. Alternatively, by adjusting the ductility or stiffness of the polymer, a pressurized material (such a liquified petroleum gas) could escape a container with an opening covered by the polymer (for example, by making the polymer brittle enough to break when exposed to the internal pressure within the container).

In some embodiments, a "healable" coating may be formed, where light responsiveness could be used in otherwise rigid coatings, to provide enough mobility for the polymer to "heal" at least some types of damage. For example, a crack in a car window, or on a screen on a mobile phone, could "heal" over time via exposure to appropriate wavelengths of light.

Similarly, in some embodiments, the disclosed polymers may be used as adaptive coatings for glass. For example, in some embodiments, the light-driven response could be used to improve impact resistance. This may include, e.g., glasses used for windshields in commercial vehicles, buildings, and mobile electronics.

In some embodiments, the disclosed polymers may be used as repairable resins for composite structures. For example, the light-driven response could be used to repair damage to large composite structures, or reduce localized stress concentrations resulting from fabrication techniques. For example, in wind turbines, building construction, and in commercial vehicles, the polymer may be disposed in a location not normally exposed to light; if damage occurs that would expose the polymer to light, such exposure could allow the polymer to become more mobile, which may allow the resin to "repair" the damage that exposed it to light in the first place.

In some embodiments, a system may include a plurality of layers of material, where one layer is a polymer glass as disclosed herein. Preferably, the polymer glass is an innermost layer or an outer-most layer.

In some embodiments, a system may include a plurality of layers of the disclosed polymer glass, where each layer may be different. For example, in some embodiments, one layer may be configured to provide a target level of stiffness when exposed to light, while another layer may be configured to provide a target less of ductility when exposed to light. In some embodiments, the azobenzene in each layer is different.

In some embodiments, the polymer glass may be used for reversible adhesion. For example, in some embodiments, a strong adhesive may be preferred, but a strong adhesive is challenging to remove if repairs are necessary. As such, having the ability to change an adhesive to a more mobile form when needed can be beneficial.

In some embodiments, reversible energy damping can provide more efficient locomotion of a limbed robot. For example, a system may be provided wherein a sensor (e.g., a camera, a pressure sensor, etc.) captures information related to a type of surface the robot is moving across or about to enter. A processor operably coupled to the sensor may determine the type of surface based on the information, and may select an appropriate light condition to expose to at least a portion of a limb of the robot comprised of the polymer glass. The system may determine that on the robot is moving, or about to move on concrete (where a rigid limb is most effective), or sand (where energy damping provides more efficient motion), and may select the appropriate light condition.

Similarly, only portions of polymer glass may need to be modified. For example, in some embodiments, the responsive material can be localized to act as a hinge anywhere that is desired along a rigid bar for mobility or object manipulation. By exposing only an intermediate portion of a rigid bar to the necessary light condition to cause the reversible transition, the ends of the rigid bar can then be repositioned relative to each other.

A responsive material may also be part of an end effector. In some embodiments, a system is provided comprising a tool with an end effector. The end effector may be a polymer glass as disclosed herein. The end effector may be configured to soften and conform around an object in response to light and then become rigid in order to more efficiently manipulate the object or even use it as a tool.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A cured polymer glass, comprising:
   a polymer glass component;
   an azobenzene photo-responsive modifying agent that causes a reversible transition in the cured polymer glass from a first state to a second state when the azobenzene photo-responsive modifying agent is exposed to a light condition;
   the polymer glass component comprises an epoxide component and an amine component, the epoxide component is diglycidylether bisphenol A (DGEBA), 1,2-epoxy-3-phenoxypropane, or a combination thereof, and the amine component is 4,4'-methylenebis(2-ethylcyclohexylamine) (MPACM), poly(propylene glycol) bis(2-aminopropyl ether) with an average molecular weight of 230 g/mol (D230), or a combination thereof;
   wherein the glass transition temperature ($T_g$) of the cured polymer glass is at least 100° C.;
   wherein the first state has at least one different mechanical property than the second state; and
   wherein the reversible transition is configured to occur when the cured polymer glass is at a first temperature below a $T_g$ of the cured polymer glass.

2. The cured polymer glass of claim 1, wherein the at least one different mechanical property is ductility.

3. The cured polymer glass of claim 1, wherein the at least one different mechanical property is stiffness.

4. The cured polymer glass of claim 1, wherein the at least one different mechanical property is dampening.

5. The cured polymer glass of claim 1, wherein the at least one different mechanical property is fracture toughness.

6. The cured polymer glass of claim 1, wherein the light condition is excitation by one or more wavelengths of light.

7. The cured polymer glass of claim 1, wherein the reversible transition occurs in less than 60 seconds.

8. The cured polymer glass of claim 1, wherein the first temperature is at least 50° C. less than the $T_g$ of the cured polymer glass.

9. The cured polymer glass of claim 1, wherein the azobenzene photo-responsive modifying agent has a structure according to formula (I):

(I)

where $R^1$, $R^2$, and $R^3$ are independently H or $NR^4R^5$; and
where $R^4$ and $R^5$ are independently H, O, an alkyl group, or a cyanate group.

10. The cured polymer glass of claim 1, wherein the azobenzene photo-responsive modifying agent is 4,4'-Diaminoazobenzene, 4-(4-Nitrophenylazo) aniline (Disperse Orange 3), 3-[N-Ethyl-4-(4-nitrophenylazo)phenylamino] propionitrile (Disperse Orange 25), or a combination thereof.

11. The cured polymer glass of claim 1, wherein the azobenzene photo-responsive modifying agent is disposed at crosslinking junctions within the cured polymer glass.

12. The cured polymer glass of claim 1, wherein the azobenzene photo-responsive modifying agent is disposed interstitially within the cured polymer glass.

13. A method for controlling a mechanical property in a polymer glass, comprising:
   providing a cured polymer glass according to claim 1; and
   causing a reversible change in a mechanical response of the cured polymer glass in less than 60 seconds by exposing the cured polymer glass to at least one light while the cured polymer glass is below its glass transition temperature ($T_g$).

14. A method for forming a cured polymer glass having mechanical properties that are adjustable while the cured glass polymer is below its glass transition temperature ($T_g$), comprising:
   providing an epoxide component, an amine component, and an azobenzene, wherein the epoxide component is diglycidylether bisphenol A (DGEBA), 1,2-epoxy-3-phenoxypropane, or a combination thereof, and the amine component is 4,4'-methylenebis(2-ethylcyclohexyl amine) (MPACM), poly(propylene glycol) bis(2-aminopropyl ether) with an average molecular weight of 230 g/mol (D230), or a combination thereof;
   forming an epoxy mixture by mixing all epoxide components together, and forming an amine mixture by mixing all amine components and all azobenzene components together;
   forming a viscous epoxy-amine polymer network by mixing the epoxy mixture and the amine mixture together;
   removing trapped gasses and bubbles from the viscous epoxy-amine polymer network;
   pouring the viscous epoxy-amine polymer network into a mold; and
   curing the viscous epoxy-amine polymer network by heating the viscous epoxy-amine polymer network using a predetermined heat schedule, the predetermined heat schedule including at least one portion of time where the temperature ramps up from a first temperature to a second temperature, and at least one additional portion of time where the temperature is maintained at the second temperature.

* * * * *